(12) United States Patent
Mao (10) Patent No.: US 8,315,250 B2
(45) Date of Patent: Nov. 20, 2012

(54) MEDIA RESOURCE ADAPTATION METHOD, MEDIA GATEWAY CONTROLLER AND SERVER

(75) Inventor: Jiahua Mao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 719 days.

(21) Appl. No.: 12/534,192

(22) Filed: Aug. 3, 2009

(65) Prior Publication Data

US 2009/0303987 A1 Dec. 10, 2009

Related U.S. Application Data

(63) Continuation of application No. PCT/CN2009/072037, filed on May 27, 2009.

(30) Foreign Application Priority Data

Jun. 5, 2008 (CN) .......................... 2008 1 0111255

(51) Int. Cl.
H04L 12/28 (2006.01)
(52) U.S. Cl. ....................................................... 370/352
(58) Field of Classification Search ........................ None
See application file for complete search history.

(56) References Cited

U.S. PATENT DOCUMENTS

| | | | | |
|---|---|---|---|---|
| 6,850,531 | B1 * | 2/2005 | Rao et al. ....................... | 370/401 |
| 7,116,985 | B2 * | 10/2006 | Wilson et al. .............. | 455/456.1 |
| 2004/0013255 | A1 | 1/2004 | Williams et al. | |
| 2004/0037407 | A1 | 2/2004 | Gourraud et al. | |
| 2006/0233183 | A1 * | 10/2006 | Soncodi ......................... | 370/401 |
| 2006/0245350 | A1 * | 11/2006 | Shei et al. ..................... | 370/216 |

FOREIGN PATENT DOCUMENTS

| | | |
|---|---|---|
| CN | 1369978 | 9/2002 |
| CN | 101094216 A | 12/2007 |
| CN | 101137120 | 3/2008 |
| CN | 101184271 A | 5/2008 |
| CN | 101291293 | 10/2008 |
| CN | 101291293 B | 8/2011 |
| EP | 1 770 952 A1 | 4/2007 |

(Continued)

OTHER PUBLICATIONS

EPO Office Action, dated Jun. 4, 2010, in the EP application No. 09 757 068.3, 6 pages.

(Continued)

*Primary Examiner* — Chirag Shah
*Assistant Examiner* — Jenkey Van
(74) *Attorney, Agent, or Firm* — Conley Rose, P.C.; Grant Rudolph (57) ABSTRACT

The embodiment of the invention provides a media resource adaptation method, a media gateway controller and a server. In an embodiment of the invention, the services, the CTIS and the MGC are deployed in the center, each dispersed area is only equipped with the access equipment or the resource equipment, the deployment structure is simple, and the maintenance workload is less. The CTIS decides the resource adaptation, and the resource can be extended to the service sides. Therefore, the resource usage is flexible. The user terminal call can obtain the local media services, which reduces the occupancy of a VoIP long-distance link, thus lowering the operation cost. Furthermore, the global share of the media resources is realized, which is favorable for load balance and reduces the cost of redundancy devices.

7 Claims, 4 Drawing Sheets

FOREIGN PATENT DOCUMENTS

| | | |
|---|---|---|
| EP | 1 890 473 A1 | 2/2008 |
| WO | WO 99/27716 | 6/1999 |
| WO | WO 03/105006 A1 | 12/2003 |
| WO | WO 2006/115976 A1 | 11/2006 |
| WO | WO 2007/093124 A1 | 8/2007 |
| WO | WO 2007/093126 A1 | 8/2007 |
| WO | WO 2007093124 * | 8/2007 |

OTHER PUBLICATIONS

Written Opinion of the International Searching Authority related to International Application No. PCT/CN2009/072037, mailed on Aug. 20, 2009, for Huawei Tech Co Ltd., et al., (4 pgs.).

PCT International Search Report for International Application No. PCT/CN2009/072037, mailed Aug. 20, 2009, 2 pgs, English translation attached.

First Office Action of the State Intellectual Property Office of the PRC for Application No. 200810111255.X, dated Mar. 10, 2010, 8 pgs, English translation attached.

European Patent Office Communication for Application No. 09757068.3 enclosing the European search report (under R. 61 or R. 63 EPC) or the supplementary European search report (Art. 153(7) EPC), dated May 12, 2010, 4 pgs.

* cited by examiner

MEDIA RESOURCE ADAPTATION METHOD, MEDIA GATEWAY CONTROLLER AND SERVER

CROSS-REFERENCE TO RELATED APPLICATIONS

This application is a continuation of International Application No. PCT/CN2009/072037, filed on May 27, 2009, which claims priority to Chinese Patent Application No. 200810111255.X, filed on Jun. 5, 2008; both of which are hereby incorporated by reference in their entireties.

FIELD OF THE TECHNOLOGY

The embodiment of the invention relates to the communication technical field, in particular to a media resource adaptation method, a media gateway controller and a server.

BACKGROUND

With the rapid development of computer and communication technologies, a telecommunication network develops to a "next generation network" based on soft-switch, and an Internet protocol contact center (hereinafter referred to as IPCC) based on the Internet protocol (hereinafter referred to as IP) technology has the tendency of gradually replacing the traditional contact centers. The IPCC is a contact center application working on a pure IP network or a hybrid switching network. Open standards of the IPCC perfectly merge various contact media and network platforms (including the Internet, telecommunication network, mobile network, cable television network, etc.), and provide diversifying service channels.

During the realization of the invention, the inventor finds that the conventional art realizes distributed application of a single IPCC, and realizes dispersed deployment of media resource by combining a service system and the media resource. For example, in an interactive voice response system (hereinafter referred to as IVR) and a voice recording system distributed in various areas, hardware resource for recording and playing voice and software resource for controlling voice recording are combined for deployment, which increases workload of service deployment and service maintenance. More importantly, ports of the media resource and ports of call repeaters have a one-to-one relation, which results in that the media resources in various areas can not be shared. For example, the IVR system in a first area corresponds to a media gateway in the first area, can not serve calls in a second area, and can not adaptively realize an allocation balance of loads in the entire network.

The conventional art realizes the distributed application of the single IPCC, and each dispersed area service system must be bound with the media resource to be deployed together, which has the disadvantages of complex deployment structure, high system maintenance cost, etc. In addition, area media resource can not be shared, and the media resource of various areas need redundant configuration, which undoubtedly increases cost of equipment and fund.

SUMMARY

The embodiment of the invention provides a media resource adaptation method, a media gateway controller and a server, and aims at solving the disadvantage that the area service system and the media resource need to be deployed together, and the disadvantages of complex structure, high system maintenance cost and the like in the distributed application of the existing single IPCC, which realizes that the services, a computer telephony integration server (hereinafter referred to as CTIS) and a media gateway controller (hereinafter referred to as MGC) are deployed in a center, each dispersed area is only equipped with access equipment or resource equipment, the deployment structure is simple and the maintenance workload is less.

The embodiment of the invention provides a media resource adaptation method which includes the following steps:

A call request message is received from a calling party user terminal; and

A media resource is allocated according to area identification information of an area where the calling party user terminal is located and which is determined by the call request message.

The embodiment of the invention provides a media gateway controller which includes a first sending module, a first receiving module and an allocation module.

The first sending module is adapted to send a call request message which carries area identification information of an area where a calling party user terminal is located;

The first receiving module is adapted to receive a media resource request message which includes the area identification information; and The allocation module is adapted to allocate a media resource according to the area identification information.

The embodiment of the invention provides a server which includes a second receiving module and a second sending module.

The second receiving module is adapted to receive a call request message which includes area identification information of an area where a calling party user terminal is located; and The second sending module is adapted to send a media resource request message which includes the area identification information that is adapted to indicate the allocation of the media resource in the area corresponding to the area identification information.

In the media resource adaptation method, the media gateway controller and the server provided by the embodiment of the invention, the services, the CTIS and the MGC are deployed in the center, each dispersed area is only equipped with the access equipment or the resource equipment, the deployment structure is simple, and the maintenance workload is less; the CTIS decides resource adaptation, the resource can be extended to service sides, and therefore the invention has the advantage of flexible resource usage, and a resource of an area can be designated to be used at the service sides; a user terminal call can obtain local media services, which reduces occupancy of a voice over IP (hereinafter referred to as VoIP) long-distance link, thus lowering operation cost; and a global share of the media resources is realized, which is favorable for load balance and reduces the cost of redundancy devices.

DETAILED DESCRIPTION

The technical proposal of the embodiment of the invention is more specifically described by reference to the accompanying drawings and preferred embodiments.

Figure 1:
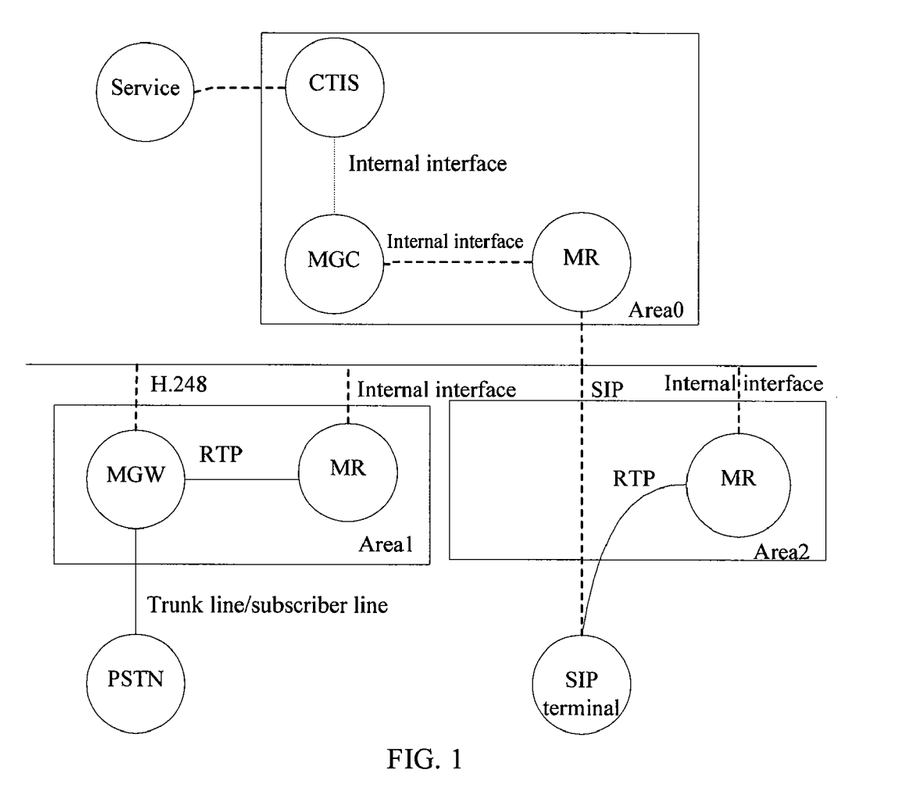
FIG. 1 is a schematic structural view of the single IPCC distributed application system according to an embodiment of the present invention.

FIG. 1 is a schematic structural view of the single IPCC distributed application system according to an embodiment of the present invention. As shown in FIG. 1, the system includes the following functional parts:

The CTIS is responsible for connection control of all the calls in the system, performs call adaptation for all the media resources in the IPCC system, and realizes application, operation and release control of the media resources by interacting with the MGC through an internal interface; the MGC is a set of multiple logic functional entities, and provides call control, connection and service functions of integrated services, which is to process signaling in short words. As shown in FIG. 1, the MGC interacts with a media gateway (hereinafter referred to as MGW) through the H.248 protocol, interacts with a session initiation protocol (hereinafter referred to as SIP) terminal by the SIP, and interacts with a media resource (hereinafter referred to as MR) and the CTIS through the internal interface; the MGW refers to equipment which can convert a data transmission format in a network into a data transmission format in another network. As shown in FIG. 1, the MGW can convert analog signals transmitted by a public switched telephone network (hereinafter referred to as PSTN) circuit into the H.248 protocol, SIP protocol and real-time transfer protocol (hereinafter referred to as RTP). In this way, the IPCC can schedule multimedia resources to provide services such as interactive voice/video, facsimile, session, etc for conventional telecommunication users and Internet users; and the media resource includes a voice resource, a video resource, a session resource, a facsimile resource, etc. The MGC stores configuration information of the MGW and the MR, and the configuration information includes identification "AREA_ID" of the areas where the devices are actually located, for example, a central area "Area_0" for which the IPCC takes the responsibility of global control management, a narrowband call access area "Area_1", a broadband call access area "Area_2", etc. The control management relations of various functional parts of the system are shown in FIG. 1, the services are centralizedly deployed in the central area of the IPCC, the media resource control is realized by a middleware CTIS of the computer telephony integration (hereinafter referred to as CTI), and the CTIS is configured to adapt an optimal media resource and control the MGC to realize the allocation of the media resource; then, the MGC controls the MGW and the MR according to an operating instruction to create a channel between a user terminal and the media resource for business services. The CTI is a technology integrating a computer, a telephone and others such as voice information transmission, and facsimile services. The CTI can improve customer relationship management. For example, information of a caller can be displayed on a screen when a called party answers the call. The CTIS is one of the entities adapted to realize the technology.

The IPCC has good extensibility and a flexible access mode, which can dispersedly deploy traffic resources and dynamically perform optimizing configuration according to the actually received calls. The IPCC also has the technical advantages of separating services from control and calls from a bearer, and realizes the separation of calls from the bearer through the MGC and the MGW. That is, the MGC processes call signaling, and the MGW processes voice channels. For a contact center with dispersed service points, the occupancy of a VoIP long-distance link is reduced in such a way that the MGC is deployed in the center and the MGW and the traffic resource are dispersedly deployed in various areas according to the local calls received, thus lowering the call processing cost.

Figure 2:
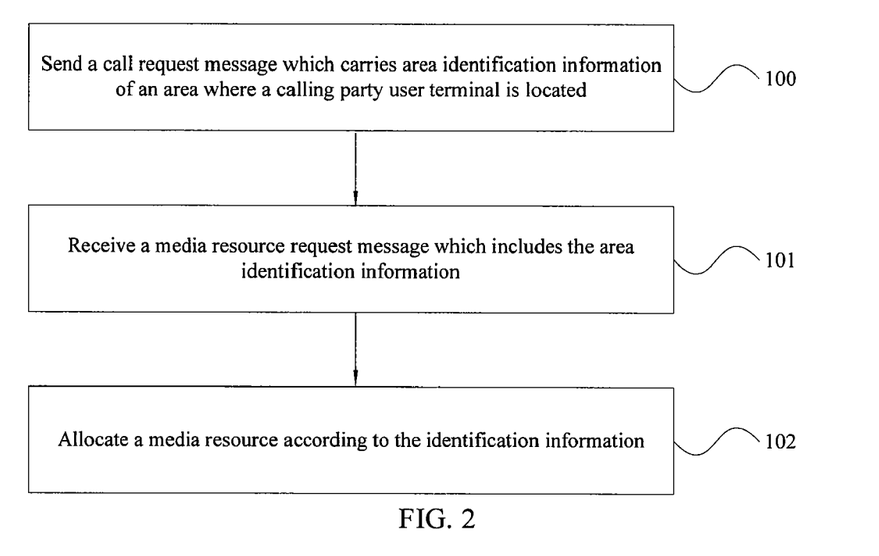
FIG. 2 is a flow chart of the media resource adaptation method according to an embodiment of the present invention.

The embodiment of the invention provides a media resource adaptation method which includes receiving a call request message from a calling party user terminal and allocating a media resource according to area identification information of an area where the calling party user terminal is located and which is determined by the call request message. A network side can determine the area where the calling party user terminal is located according to the call request message when receiving the call request message from the calling party user terminal, obtain the area identification information of the area, and allocate the media resources of the area where the user terminal is located and adjacent areas for the user terminal based on resource allocation policies according to the area identification information so as to provide services for the calling party user terminal. In the embodiment, the network side is adapted to receive the call request message, obtain the area identification information, allocate the media resources, etc. Various functional entities at the network side can be integrated and can also perform their functions, respectively. The following is the detailed description where the network side applies multiple functional entities to the media resource adaptation FIG. 2 is a flow chart of the media resource adaptation method according to an embodiment of the present invention. As shown in FIG. 2, the method includes the following blocks:

Block 100: Sending a call request message which carries area identification information of an area where a calling party user terminal is located;

For example, after receiving the call request message from the calling party user terminal, the MGC can obtain the area from which a call comes according to the call request message, and obtain the area identification information of the area, that is to say, the MGC identifies the area from which the call of an incoming call system comes; for a narrowband call, the MGC obtains the source area of the call by accessing the MGW of the call; and for a broadband call, the MGC matches the source area of the call through an IP address range of an SIP terminal. The call request message sent by the MGC to the CTIS carries an area identification "AREA_ID" of the call source area to inform the CTIS of the source area of the call request.

Block 101: Receiving a media resource request message which includes the area identification information.

For example, after receiving the call request message sent by the MGC, the CTIS stores the "AREA_ID" information of the call request message and sends the media resource request message to the MGC by applying for an internal interface of the media resource according to service requirements, i.e. requesting the MGC to allocate an appropriate media resource for the call. The media resource request message can be sent to the MGC by carrying the "AREA_ID" of the call, which indicates that the media resource located in the same area as the calling party user terminal is applied to serve the call.

Another case is that the media resource request message is sent by carrying the "AREA_ID" and resource assistance flag information "ASSIST_FLAG" of the call. Some unusual media resources such as a facsimile resource may not be deployed in each area. In this situation, a service can initiate the media resource request carrying the resource assistance flag information to the MGC through the CTIS. When the MGC can not allocate the media resource in a designated area, the MGC can allocate the media resource of an adjacent area to the CTIS. In this way, the global sharing of the media resources is realized, and the normal operation of the services is not affected as the area where the user terminal is located does not have the corresponding resource.

Block 102: Allocating the media resource according to the area identification information.

For example, after receiving the media resource request message sent by the CTIS, the MGC can allocate an appropriate media resource to the CTIS according to the information carried by the media resource request message. More specifically, when the received media resource request message carries the area identification information of the area where the calling party user terminal is located, the MGC allocates the media resource of the area corresponding to the area identification information. When the received media resource request message carries the area identification information of the area where the calling party user terminal is located and the media resource request message of the resource assistance flag information, the MGC allocates the media resource of the area corresponding to the area identification information or the adjacent area of the area corresponding to the area identification information. The resource assistance flag information is used when the area corresponding to the area identification information has no idle media resource. In this case, the MGC can allocate the media resource of the adjacent area corresponding to the area identification information to the calling party user terminal according to the resource assistance flag information.

Specifically, the MGC look ups a media resource information table of the area (i.e., the area where the calling party user terminal is located) corresponding to the area identification information according to the area identification information carried in the media resource request message, and judges whether an idle media resource corresponding to the service requirements exists in a local area. If the idle media resource exists, request information for allocating the media resource is sent to a media resource controller which is responsible to manage the media resource in the local area, and the request information includes the media identification information of the idle media resource which is allocated by the MGC. The media resource controller in the local area returns successful response information for the allocation of the media resource to the MGC, that is, the MGC succeeds in allocating the media resource to the call service. When the media resource request message sent by the CTIS includes only the area identification information, failure information is returned and the call request fails if the idle media resource corresponding to the service requirements does not exist in the local area.

When the media resource request message received by the MGC includes the area identification information and the resource assistance flag information, the MGC first look ups whether the idle media resource corresponding to the service requirements exists in the media resource information table of the area corresponding to the area identification information (i.e., the local area). If the idle media resource does not exist, as the media resource request message also includes the resource assistance flag information, which indicates that the CTIS allows the MGC to allocate the media resource of other adjacent area to serve the call. The MGC looks up for the appropriate media resource in the adjacent area of the area designated by the CTIS according to the resource assistance flag information, and the search procedure is similar, that is, the MGC look ups the media resource information table of the adjacent area. If the appropriate media resource exists, the MGC sends the request information for allocating the media resource to the media resource controller which is responsible to manage the media resource in the adjacent area, and the request information includes the media identification information of the idle media resource which is allocated by the MGC. The media resource controller in the adjacent area returns the successful response information for the allocation of the media resource to the MGC, that is, the MGC succeeds in allocating the media resource to the call service. After successfully allocating the media resource, the MGC sets the attribute information of the allocated media resource to be the occupied state in the media resource information table where the allocated media resource is located so as to avoid a resource allocation error.

In the embodiment, an executive body for sending the call request message, receiving the media resource request message, allocating the media resource and the like may not be the MGC but another entity, as long as the preceding functions can be realized.

The embodiment provides the method for the dispersedly deployed media resource adapting the incoming call and realizing the distributed application of the single IPCC. In the method, the media resources are dispersedly deployed, and the media resources are adapted for the calls dispersed in different areas at the minimum cost, the local media resources preferably serve the local calls, and in the meanwhile, the global media resources can assist with each other in realizing the global sharing of the media resource, thus improving the service quality of the IPCC.

In the above method embodiment, after successfully allocating the required media resource, the MGC responds to the media resource request message sent by the CTIS, that is, the MGC sends the response information of the media resource request message, which carries the area identification information of the area where the media resource is located and the media identification information to inform the CTIS of the specific media resource which is allocated to the service in the specific area; The CTIS sends a call response message to the MGC, and the MGC controls the calling party user terminal to establish a media channel with the allocated media resource after receiving the message and controls the media resource to provide media services for the calling party user terminal according to an operating instruction message sent by the CTIS.

In the above method embodiment, after the media resource provides the service for the calling party user terminal, the method also includes releasing the media resource and the step of releasing the media resource specifically includes the following steps: the CTIS sends a request message for releasing the media resource to the MGC and informs the MGC of the specific media resource which is requested for releasing by the area identification information of the area where the media resource is located and the media identification information included in the message; after receiving the request message, the MGC sends a release request message carrying the media identification information to the media resource controller of the area corresponding to the area identification information to request the media resource controller to release the media resource; the media resource controller returns a release result to the MGC, and after receiving a successful release response message returned by the media resource controller, the MGC sends a response message for releasing the media resource to the CTIS and sets the attribute information of the media resource to be the unoccupied state in the media resource information table for the use of other services.

In the media resource adaptation method provided in the embodiment, the services, the CTIS and the MGC are deployed in the center, various dispersed areas are only equipped with the access equipment or the resource equipment, the deployment structure is simple, and the maintenance workload is less; the CTIS decides the resource adaptation, the resource can be extended to the service sides, and therefore the method has the advantage of the flexible resource usage, and the resource of the area can be designated to be used at the service sides; the user terminal call can obtain the local media services, which reduces the occupancy of the VoIP long-distance link; the VoIP converts voice or facsimile into data and shares the IP network with the data; thus lowering the operation cost; and the global share of the media resources is realized, which is favorable for load balance and reduces the cost of the redundancy devices.

Figure 3:
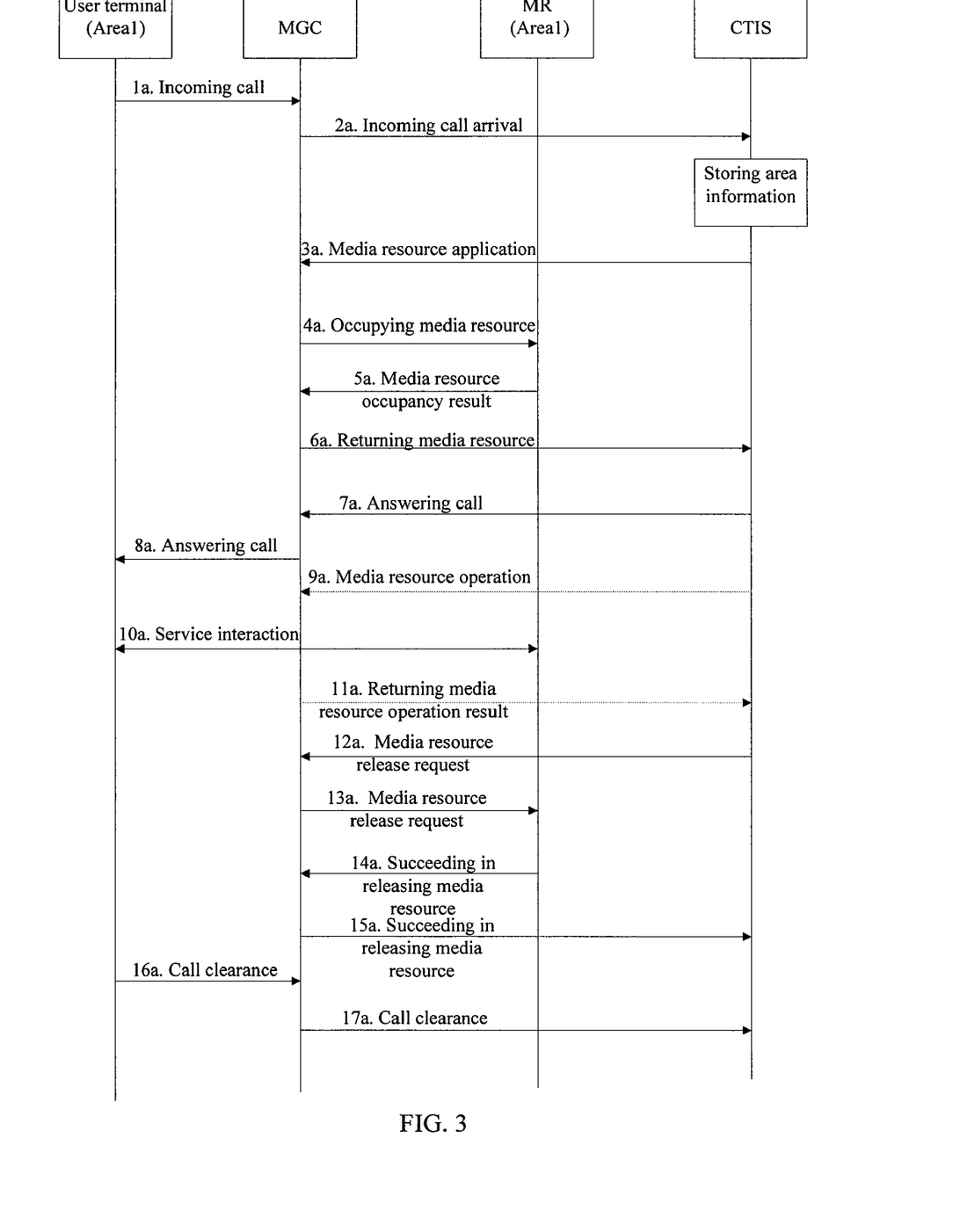
FIG. 3 is a signaling flow chart of the media resource adaptation method according to an embodiment of the present invention.

FIG. 3 is a signaling flow chart of the media resource adaptation method according to an embodiment of the present invention. As shown in FIG. 3, the method includes the following Blocks:

Block 1a: The user terminal of an Area1 calls the IPCC, and the signaling of the incoming call is sent to the MGC;

If the call is accessed through the MGW, the signaling is the H.248 protocol, and the MGC obtains the area where the MGW is located through configuration data; if the call is accessed through the SIP terminal, the signaling is the SIP protocol, and the MGC obtains the area where the SIP terminal is located through the IP address. In either access mode, the Area1 where the user is located can be obtained. The user terminal generally refers to a telephone terminal, which can be a narrowband telephone set, a broadband telephone set, an IP software telephone, etc.

Block 2a: The MGC informs the CTIS of the call request message through an internal interface, and the call request message sends the area identification "Area_1" to which the call belongs to the CTIS through extension information; the CTIS allocates a control block to the call, and stores the area identification "Area_1" of the call in the control block;

Block 3a: The CTIS applies to the MGC for the media resource (for example, a voice resource) according to the service requirements, and a media resource application message transmits a designated area identification "Area_1" to the MGC through the extension information;

Block 4a: The MGC look ups the media resource information table of the Area1, and sends the message for allocating the media resource V1 to the media resource controller if the idle media resource V1 exists in the Area1;

Block 5a: The media resource controller allocates the media resource V1, and returns the result of allocating the media resource V1 to the MGC;

Block 6a: The MGC returns a media resource application result to the CTIS, the applied media resource is V1, the extension information of the applied media resource includes the area identification "Area_1" of the V1, and the MGC sets the attribute information of the media resource V1 to be the occupied state in the media resource information table of the Area1;

Block 7a: The CTIS succeeds in applying for the media resource for the call, and sends the message for answering the call to the MGC;

Block 8a: The MGC sends the signaling for answering the call to the user terminal, and controls the user terminal to establish the media channel with the media resource V1;

As in the same area, and the VoIP link occupied by the media channel is very short, the user terminal can interact with the media resource;

Block 9a: After the media channel is established, the CTIS can send the media operation requests such as voice playing, video playing, audio recording, video recording and the like to the MGC according to the type of the media resource;

Taking the application for the voice resource as an example, the services send the requests such as playback, number receiving etc of the V1 of the Area1 to the MGC through the CTIS;

Block 10a: The MGC controls the media resource controller to realize that the media resource V1 provides the media services for the user terminal through the RTP protocol, i.e. voice interaction;

Block 11a: The MGC returns the operation results of the media resource V1 such as a recording and playing result and a number receiving result to the CTIS, and the CTIS proceeds with further processing according to the service requirements;

The Block 9a, the Block 10a and the Block 11a are repeated if another resource operation is required, and Block 12a is performed if the media resource is not required;

Block 12a: The CTIS requests the MGC to release the media resource V1, and the extension information of the message for requesting to release the media resource includes the area identification "Area_1" of the media resource V1;

Block 13a: The MGC sends the message for releasing the media resource V1 to the media resource controller of the Area1;

Block 14a: The media resource controller of the Area1 releases the media resource V1, and returns the result of releasing the media resource V1 to the MGC;

Block 15a: The MGC returns the release result of the media resource V1 to the CTIS, and sets the stored attribute information of the media resource V1 to be the unoccupied state in the media resource information table of the Area1;

Block 16a: The user terminal completes the services and hangs up, and the call signaling cleared by the control block is sent to the MGC; and Block 17a: The MGC informs the CTIS of the message that the control block clears the call, and the CTIS clears the control block and the area identification "Area_1" stored in the control block.

The embodiment provides the method for serving the local call through the local media resource; the CTIS decides resource adaptation and the resource can be extended to the service sides, and therefore, the resource usage is flexible; the resource of the area can be designated to be used at the service sides, for example, all audio recordings are designated in an area; and the user call obtains the local media services, which reduces the occupancy of the VoIP long-distance link, thus lowering the operation cost.

Figure 4:
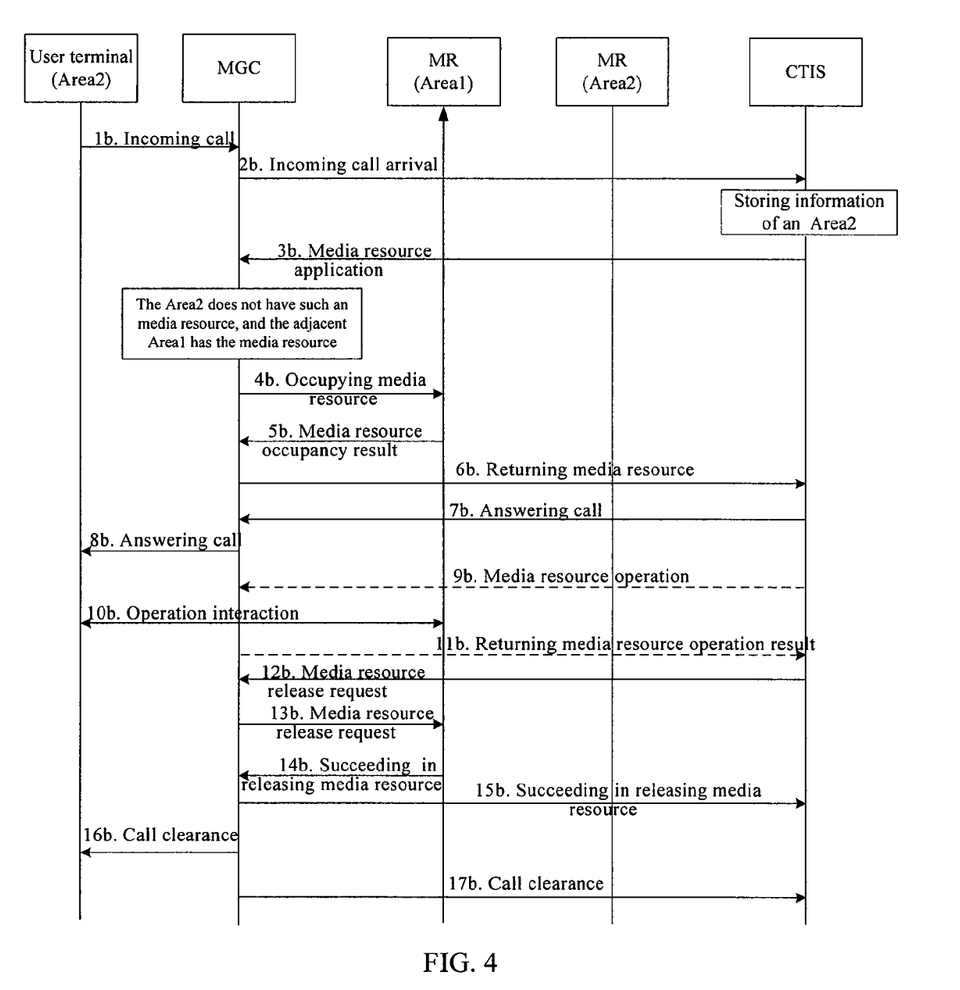
FIG. 4 is a signaling flow chart of the media resource adaptation method according to an embodiment of the present invention.

FIG. 4 is a signaling flow chart of the media resource adaptation method according to an embodiment of the present invention. As shown in FIG. 4, the method includes the following blocks:

Block 1b: The user terminal of an Area2 calls the IPCC, and the signaling of the incoming call is sent to an MGC;

As the call is accessed through the SIP terminal, the signaling is the SIP protocol, the MGC obtains the area where the SIP terminal is located through the IP address, and obtains the area identification "Area_2" where the user is located;

Block 2b: The MGC informs the CTIS of the call request message through the internal interface, and the call request message transmits the area identification "Area_2" to which the call belongs to the CTIS through extension information; the CTIS allocates the control block to the call, and stores the area identification "Area_2" of the call in the control block;

Block 3b: The CTIS applies to the MGC for the media resource such as the voice resource according to the service requirements, and the media resource application message transmits the designated area identification "Area_2" and the resource assistance flag "ASSIST_FLAG" to the MGC through the extension information;

Block 4b: The MGC look ups the media resource information table of the Area2, and finds that a corresponding idle media resource does not exist in the Area2; as the resource application request of the CTIS carries the resource assistance flag "ASSIST_FLAG", the MGC look ups the media resource information table of the adjacent area, and sends the message for allocating the media resource V2 to the media resource controller of the Area1 if the corresponding idle media resource exists in the Area1;

Block 5b: The MR of the Area1 allocates the media resource V2, and returns the result of allocating the media resource V2 to the MGC;

Block 6b: The MGC returns the media resource application result to the CTIS, the applied media resource is V2, the extension information of the applied media resource includes the area identification "Area_1" of the V2, and the MGC sets the attribute information of the media resource V2 to be the occupied state in the media resource information table of the Area1;

Block 7b: The CTIS succeeds in applying for the media resource for the call, stores the area identification "Area_1" of the media resource V2, and sends the message for answering the call to the MGC;

Block 8b: The MGC sends the signaling for answering the call to the user terminal and controls the user terminal to establish the media channel with the media resource V2, and the user terminal can interact with the media resource;

Block 9b: After the media channel is established, the services can send the media operation requests such as the voice playing, the video playing, the audio recording, the video recording and the like to the MGC through the CTIS according to the type of the media resource;

Taking the application for the voice resource as an example, the services send the voice playing and the number receiving requests of the media resource V2 of the Area1 to the MGC through the CTIS to realize interactive voice response services;

Block 10b: The MGC controls the media resource controller to realize that the media resource V2 provides the media services such as the voice interaction for the user terminal through the RTP protocol;

Block 11b: The MGC returns the operation result of the media resource V2 such as the playback result and the number receiving result to the CTIS;

The CTIS proceeds with further processing according to the service requirements, the Block 9b, the Block 10b and the Block 11b are repeated if another resource operation is required, and Block 12b is performed if the media resource is not required;

Block 12b: The CTIS requests the MGC to release the media resource V2, and requests the MGC to release the extension information of the media resource message, including the area identification "Area_1" of the media resource V2;

Block 13b: The MGC sends the message for releasing the media resource V2 to the media resource controller of the Area1;

Block 14b: The media resource controller of the Area1 releases the media resource V2, and returns the result of releasing the media resource V2 to the MGC;

Block 15b: The MGC returns the release result of the media resource V2 to the CTIS, and sets the attribute information of the media resource V2 to be the unoccupied state in the stored media resource information of the Area1;

Block 16b: The user terminal completes the services and hangs up, and the call signaling cleared by the control block is sent to the MGC; and Block 17b: The MGC informs the CTIS of the message that the control block clears the call, and the CTIS clears the control block and the area identification "Area_1" stored in the control block.

The embodiment provides a method for realizing interaction through a global media resource, and the global share of the media resource is realized, which is favorable for load balance and reduces the cost of redundancy devices.

People skilled in this art can understand that: the implementation of all or part of the steps in the above-mentioned method embodiments can be completed by hardware related to program instructions. The program may be stored in a computer readable storage medium. During running, the program executes the steps comprising the above-mentioned method embodiments. The storage medium comprises the various media which are able to store program codes such as ROM, RAM, diskette or compact disc, etc.

Figure 5:
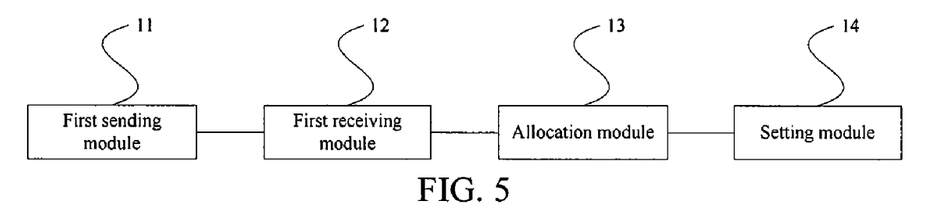
FIG. 5 is a schematic structural view of the media gateway controller according to an embodiment of the present invention.

FIG. 5 is a schematic structural view of the media gateway controller according to an embodiment of the present invention. As shown in FIG. 5, the media gateway controller includes a first sending module 11, a first receiving module 12 and an allocation module 13. The first sending module 11 is adapted to send a call request message which carries area identification information of an area where a calling party user terminal is located; the first receiving module 12 is adapted to receive a media resource request message which includes the area identification information; and the allocation module 13 is adapted to allocate a media resource according to the area identification information.

Specifically, after receiving the call request message sent by the calling party user terminal, the media gateway controller obtains the area identification information of the area where the calling party user terminal is located through an access mode, and sends the call request message carrying the area identification information to the CTIS through the first sending module 11; the CTIS returns the media resource request message carrying the area identification information, which is adapted to instruct the media gateway controller to allocate the media resource in the area corresponding to the area identification information to the calling party user terminal; and after receiving the message, the first receiving module 12 allocates the media resource of the area corresponding to the area identification information to the call service through the allocation module 13 according to the area identification information carried by the message.

Furthermore, when the media resource request message returned by the CTIS and received by the first receiving module 12 includes the area identification information and the resource assistance flag information, and the area corresponding to the area identification information has no idle media resource, the allocation module 13 is also adapted to allocate the media resource of the area corresponding to the area identification information or an adjacent area of the area corresponding to the area identification information according to the resource assistance flag information. Specifically, when the media resource request message includes the area identification information, the allocation module 13 looks up for an appropriate media resource in a media resource information table of the area corresponding to the area identification information according to the included area identification information and sends an allocation request to a media resource controller in the area for allocating the media resource to the call service when the appropriate media resource is found. The allocation module 13 is also adapted to look up for a required media resource in the adjacent area according to the media resource request message including the area identification information and the resource assistance flag information when there is no required media resource in the area corresponding to the area identification information and send an allocation request for allocating the media resource to the call service.

The media gateway controller provided by the embodiment also includes a setting module 14 which is adapted to set the attribute information of the media resource in the media resource information table. Specifically, after allocating the media resource to the call service, the media gateway controller sets the attribute information of the media resource to be the occupied state in the media resource information table through the setting module 14; when the service is completed and the allocated media resource is released, the media gateway controller sets the attribute information of the media resource to be the unoccupied state in the media resource information table through the setting module 14 for a subsequent service.

The media gateway controller provided by the embodiment looks up for the appropriate media resource in the local area or the adjacent area according to different information included in the media resource request message sent by the CTIS, and allocates the appropriate media resource to the call service; the user terminal call can obtain local media services, which reduces the occupancy of the VoIP long-distance link, thus lowering the operation cost; and, the global share of the media resources is realized, which is favorable for load balance and reduces the cost of redundancy devices.

Figure 6:
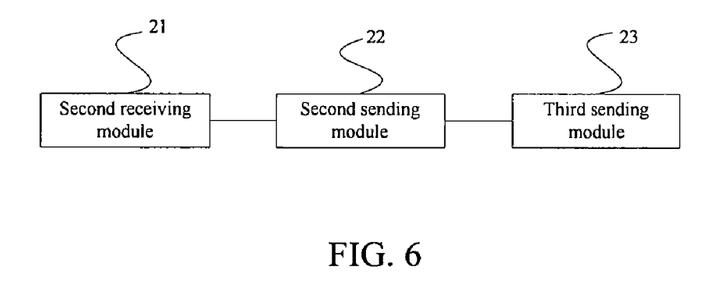
FIG. 6 is a schematic structural view of the server according to an embodiment of the present invention.

FIG. 6 is a schematic structural view of the server according to an embodiment of the present invention. As shown in FIG. 6, the server of the embodiment can be the CTIS; the server includes a second receiving module 21 and a second sending module 22; wherein the second receiving module 21 is adapted to receive a call request message which includes area identification information of an area where a calling party user terminal is located; and the second sending module 22 is adapted to send a media resource request message which includes the area identification information, and the area identification information is adapted to indicate media resource allocation in the area corresponding to the area identification information.

Specifically, after receiving the call request message sent by the MGC, the second sending module 22 sends a media resource request message to the MGC according to service requirements to request the MGC to allocate an appropriate media resource to the call request. More specifically, the second sending module 22 is also adapted to send the media resource request message which includes the area identification information and resource assistance flag information. The CTIS instructs the MGC to look up for the required media resource in the area where the required media resource is located according to the call request. Some unusual media resources such as a facsimile resource which may not be deployed in each area. In this situation, a service can initiate a resource request carrying the resource assistance flag "ASSIST FLAG" to the MGC through the second sending module 22 of the CTIS. When the MGC can not allocate the media resource in a designated area, the MGC allocates the media resource of the adjacent area to the CTIS, thus realizing the global share of the media resource and the normal service operation is not affected as the area where the user is located does not have the corresponding resource.

Furthermore, the CTIS also includes a third sending module 23 which is adapted to send an operating instruction message that is adapted to control the media resource to provide media services for the calling party user terminal. The CTIS sends an operating instruction to the MGC through the third sending module 23 after allocating the media resource to the call service, and the MGC controls the media resource to provide business services for the calling party user terminal according to the operating instruction.

The server provided by the embodiment is responsible for the connection control of all the calls in the system, performs call adaptation for all the media resources in the IPCC system, and realizes the application for and the operation of the media resource by interacting with the MGC through the internal interface.

The embodiment of the device are exemplary only, the units described as separated parts can be or can not be physically separated, and the parts shown as units can be or can not be physical units, that is, the parts can be located in a place or distributed in multiple network units. Part or all of the modules of the device can be selected to achieve the purposes of the proposal of the embodiment according to the actual demand. It can be understood and implemented by those of ordinary skill in the art without creative labor.

Through the description of the preferred embodiments, it can be clearly understood by those of skill in the art that various embodiments can be realized by virtue of software plus necessary general-purpose hardware platforms and by virtue of hardware. Based on such understanding, the parts which substantially contribute to the conventional art of the technical proposal can be embodied in the form of a computer software product, which can be stored in computer-readable storage media such as an ROM/RAM, a disk, an CD, etc and includes multiple instructions to instruct computer equipment (which can be a personal computer, a server, network equipment, or the like) to execute each embodiment or the method described by some parts of the embodiment.

Finally, it should be understood that the above embodiments are only used to explain, but not to limit the technical solution of the present invention. In despite of the detailed description of the present invention with referring to above embodiments, it should be understood that various modifications, changes or equivalent replacements can be made by those skilled in the art without departing from the scope of the present invention and covered in the claims of the present invention.

What is claimed is:

1. A media resource adaptation method, comprising:
receiving, by a media gateway controller, a call request message from a calling party user terminal, and determining area identification information of an area where the calling party user terminal is located according to the call request message;
sending, by the media gateway controller, the call request message carrying the area identification information by the media gateway controller to a telephony integration server;
receiving, by the media gateway controller, a media resource request message returned by the telephony integration server, wherein the media resource request message comprises the area identification information;

looking up, by the media gateway controller, a media resource information table of the area corresponding to the area identification information;

if there is no required media resource in the area corresponding to the area identification information, looking up a media resource information table of an adjacent area of the area corresponding to the area identification information according to resource assistance flag information and sending request information for occupying the media resource to a media resource controller of the adjacent area, wherein the request information comprises media identification information of the media resource; and receiving, by the media gateway controller, successful response information returned by the media resource controller.

2. The method according to claim 1, wherein after receiving, by the media gateway controller, the successful response information returned by the media resource controller, the method comprises:

setting, by the media gateway controller, attribute information of the media resource in the media resource information table of the adjacent area to be an occupied state according to the successful response information.

3. A media resource adaptation method, comprising:

receiving, by a media gateway controller, a call request message from a calling party user terminal, and determining area identification information of an area where the calling party user terminal is located according to the call request message;

sending, by the media gateway controller, the call request message carrying the area identification information by the media gateway controller to a telephony integration server;

receiving, by the media gateway controller, a media resource request message returned by the telephony integration server, wherein the media resource request message comprises the area identification information;

looking up, by the media gateway controller, a media resource information table of the area corresponding to the area identification information, and sending request information for occupying media resource to a media resource controller of the area corresponding to the area identification information, wherein the request information comprises media identification information of the media resource;

receiving, by the media gateway controller, successful response information returned by the media resource controller;

sending, by the media gateway controller, response information of the media resource request message carrying the area identification information of the area where the media resource is located and the media identification information to the telephony integration server by the media gateway controller; and receiving, by the media gateway controller, a call response message returned by the telephony integration server to control the calling party user terminal to establish a media channel with the media resource.

4. The method according to claim 3, wherein after allocating, by the media gateway controller, the media resource according to the area identification information, the method comprises:

receiving, by the media gateway controller, a request message for releasing the media resource, wherein the request message comprises the area identification information of the area where the media resource is located and the media identification information;

sending, by the media gateway controller, a release request message carrying the media identification information to the media resource controller of the area corresponding to the area identification information; and receiving, by the media gateway controller, a successful release response message returned by the media resource controller.

5. The method according to claim 4, wherein after receiving, by the media gateway controller, the successful release response message returned by the media resource controller, the method comprises:

sending, by the media gateway controller, a response message for releasing the media resource and setting attribute information of the media resource in the media resource information table to be an unoccupied state.

6. A media gateway controller, comprising:

a tangible non-transitory computer readable medium and processor for executing instructions stored on the computer readable medium, the computer readable medium further comprising:

a first receiving module comprising instructions that when executed, receives a call request message from a calling party user terminal, and determines area identification information of an area where the calling party user terminal is located according to the call request message;

a sending module comprising instructions that when executed, sends the call request message, wherein the call request message carries the area identification information to a telephony integration server;

a second receiving module comprising instructions that when executed, receives a media resource request message returned by the telephony integration server, wherein the media resource request message comprises the area identification information; and an allocation module comprising instructions that when executed, looks up a media resource information table of the area corresponding to the area identification information; if there is no required media resource in the area corresponding to the area identification information, looks up a media resource information table of an adjacent area of the area corresponding to the area identification information according to resource assistance flag information and sends a request information for occupying the media resource to a media resource controller of the adjacent area, wherein the request information comprises media identification information of the media resource; and receives successful response information returned by the media resource controller.

7. A media gateway controller, comprising:

a tangible non-transitory computer readable medium and processor for executing instructions stored on the computer readable medium, the computer readable medium further comprising:

a first receiving module comprising instructions that when executed, receives a call request message from a calling party user terminal, and determines area identification information of an area where the calling party user terminal is located according to the call request message;

a sending module comprising instructions that when executed, sends the call request message carrying the area identification information by the media gateway controller to a telephony integration server;

a second receiving module comprising instructions that when executed, receives a media resource request message returned by the telephony integration server, wherein the media resource request message comprises the area identification information;

an allocating module comprising instructions that when executed, looks up a media resource information table of the area corresponding to the area identification information, and sends request information for occupying media resource to a media resource controller of the area corresponding to the area identification information, wherein the request information comprises media identification information of the media resource; receives successful response information returned by the media resource controller; sends response information of the media resource request message carrying the area identification information of the area where the media resource is located and the media identification information to the telephony integration server by the media gateway controller; and receives a call response message returned by the telephony integration server to control the calling party user terminal to establish a media channel with the media resource.

* * * * *

UNITED STATES PATENT AND TRADEMARK OFFICE
CERTIFICATE OF CORRECTION

| | | |
|---|---|---|
| PATENT NO. | : 8,315,250 B2 | Page 1 of 1 |
| APPLICATION NO. | : 12/534192 | |
| DATED | : November 20, 2012 | |
| INVENTOR(S) | : Jiahua Mao | |

It is certified that error appears in the above-identified patent and that said Letters Patent is hereby corrected as shown below:

On the title page, item (74) Delete "Conley Rose, P.C.; Grant Rudolph" and insert --Conley Rose, P.C.; Grant Rodolph--.

Signed and Sealed this
Nineteenth Day of February, 2013

Teresa Stanek Rea
*Acting Director of the United States Patent and Trademark Office*